United States Patent
Roithmeier

(10) Patent No.: US 8,638,984 B2
(45) Date of Patent: Jan. 28, 2014

(54) DISPLAY OF RESULTS OF A MEASUREMENT OF WORKPIECES AS A FUNCTION OF THE DETECTION OF THE GESTURE OF A USER

(75) Inventor: Robert Roithmeier, Seehausen am Staffelsee (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 521 days.

(21) Appl. No.: 12/988,880

(22) PCT Filed: Apr. 2, 2009

(86) PCT No.: PCT/EP2009/002414
§ 371 (c)(1),
(2), (4) Date: Oct. 21, 2010

(87) PCT Pub. No.: WO2009/129916
PCT Pub. Date: Oct. 29, 2009

(65) Prior Publication Data
US 2011/0035952 A1 Feb. 17, 2011

(30) Foreign Application Priority Data
Apr. 21, 2008 (DE) .......................... 10 2008 020 772

(51) Int. Cl.
| | | |
|---|---|---|
| *G06K 9/00* | (2006.01) | |
| *G05B 11/01* | (2006.01) | |
| *G05B 15/00* | (2006.01) | |
| *G06F 3/033* | (2013.01) | |
| *G09G 5/00* | (2006.01) | |

(52) U.S. Cl.
USPC ............ 382/103; 382/151; 382/152; 700/17; 700/83; 700/180; 345/156; 715/863

(58) Field of Classification Search
USPC ...................... 700/17, 83, 180, 264; 345/156; 356/614, 620; 382/103, 151–152; 715/863
See application file for complete search history.

(56) References Cited

U.S. PATENT DOCUMENTS

| | | |
|---|---|---|
| 6,191,773 B1 | 2/2001 | Maruno et al. |
| 6,283,860 B1 * | 9/2001 | Lyons et al. ............... 463/36 |

(Continued)

FOREIGN PATENT DOCUMENTS

| | | |
|---|---|---|
| DE | 198 05 155 A1 | 8/1999 |
| DE | 198 45 030 A1 | 4/2000 |

(Continued)

OTHER PUBLICATIONS

Quek F K H: "Toward A Vision-Based Hand Gesture Interface" Virtual Reality Software and Technology. Proceedings of Thevrst Conference, XX, XX, Aug. 23, 1994, pp. 17-31, XP000675678.

*Primary Examiner* — Ramesh Patel
(74) *Attorney, Agent, or Firm* — Laurence A. Greenberg; Werner H. Stemer; Ralph E. Locher

(57) ABSTRACT

A gesture detection device detects a gesture of a user, which is a movement which is carried out by a hand or by both hands of the user on an existing example of the work piece, or on an image of an existing example of the work piece. An identification device identifies the gesture as a predefined gesture, which represents a symbol. A selection device selects a measurement result in dependence on the identified gesture. The measurement result can then be displayed or marked.

20 Claims, 12 Drawing Sheets

(56) References Cited

U.S. PATENT DOCUMENTS

| | | |
|---|---|---|
| 6,359,612 B1 | 3/2002 | Peter et al. |
| 6,522,993 B1 | 2/2003 | Tomko |
| 6,564,144 B1 * | 5/2003 | Cherveny .................... 701/461 |
| 6,741,948 B2 | 5/2004 | Hauger et al. |
| 6,750,848 B1 * | 6/2004 | Pryor .......................... 345/168 |
| 7,353,082 B2 | 4/2008 | Pretlove et al. |
| 7,423,658 B1 | 9/2008 | Uomori et al. |
| 7,444,001 B2 * | 10/2008 | Roberts et al. ............... 382/100 |
| 7,701,439 B2 * | 4/2010 | Hillis et al. .................. 345/156 |
| 7,706,896 B2 * | 4/2010 | Music et al. .................. 700/17 |
| 7,714,895 B2 * | 5/2010 | Pretlove et al. ............ 348/211.2 |
| 7,844,921 B2 * | 11/2010 | Ike et al. ...................... 715/863 |
| 7,849,421 B2 * | 12/2010 | Yoo et al. ...................... 715/863 |
| 8,180,114 B2 * | 5/2012 | Nishihara et al. ............. 382/114 |
| 8,237,655 B2 * | 8/2012 | Yabe et al. .................... 345/157 |
| 8,311,370 B2 * | 11/2012 | Ha et al. ........................ 382/313 |
| 8,323,106 B2 * | 12/2012 | Zalewski ........................ 463/31 |
| 8,325,214 B2 * | 12/2012 | Hildreth ...................... 348/14.03 |
| 8,345,920 B2 * | 1/2013 | Ferren et al. .................. 382/103 |
| 8,402,393 B2 * | 3/2013 | Han et al. ...................... 715/848 |
| 2002/0044104 A1 | 4/2002 | Friedrich et al. |
| 2003/0125901 A1 | 7/2003 | Steffey et al. |
| 2003/0132950 A1 * | 7/2003 | Surucu et al. .................. 345/700 |
| 2007/0216642 A1 | 9/2007 | Kneissler |
| 2008/0013793 A1 | 1/2008 | Hillis et al. |
| 2011/0012830 A1 * | 1/2011 | Yeh ................................ 345/158 |
| 2011/0019205 A1 * | 1/2011 | Gerber et al. .................. 356/615 |
| 2012/0057081 A1 * | 3/2012 | Petersson et al. ............. 348/734 |

FOREIGN PATENT DOCUMENTS

| | | |
|---|---|---|
| DE | 10100335 A1 | 8/2002 |
| EP | 1102211 A2 | 5/2001 |
| EP | 1 537 959 A2 | 6/2005 |
| JP | 2000276613 A | 10/2000 |
| WO | 0052539 A1 | 9/2000 |

* cited by examiner

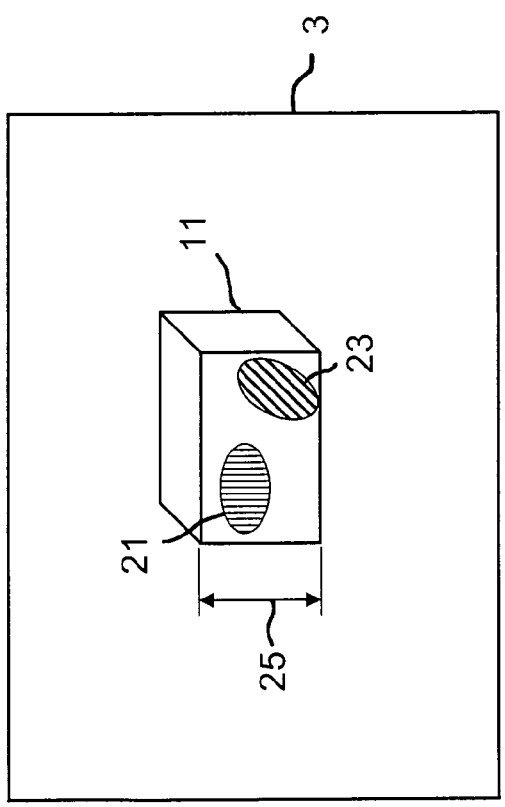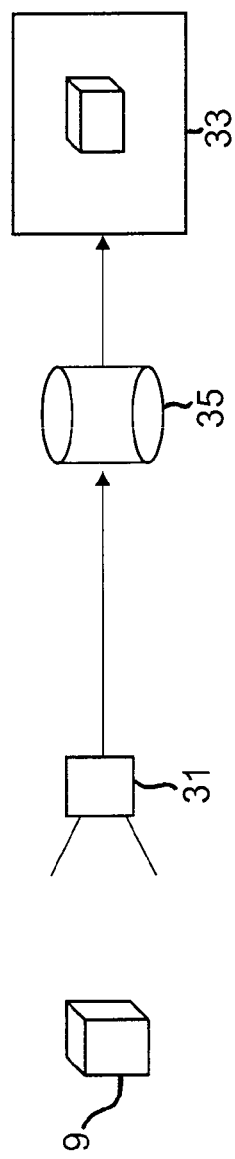

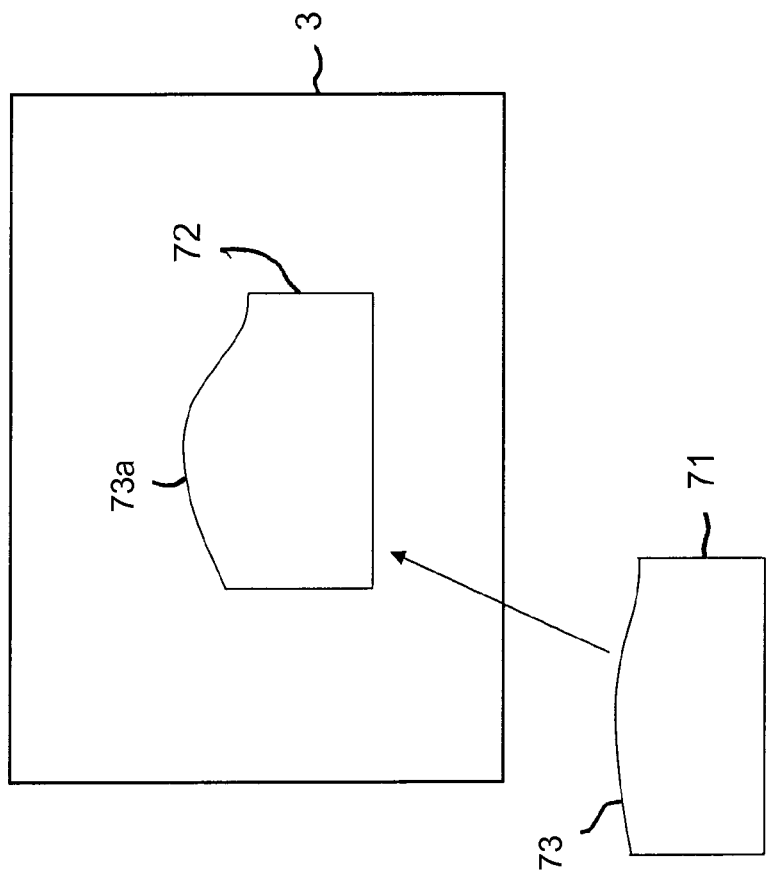

DISPLAY OF RESULTS OF A MEASUREMENT OF WORKPIECES AS A FUNCTION OF THE DETECTION OF THE GESTURE OF A USER

BACKGROUND OF THE INVENTION

Field of the Invention

The invention relates to a method and an arrangement for the display of results of a measurement of workpieces. The invention relates, in particular, to the display of measurement results on the operation of coordinate measuring machines. A workpiece is understood here as any possible object that can be manufactured by hand or machine or in some other way.

Coordinate measuring machines are understood as any machines that are capable of measuring coordinates, in particular surface coordinates, of workpieces. It is possible in this case to use, for example, optical and/or mechanical (that is to say mechanically scanning) measuring methods. The optical measuring methods also include methods that use invasive radiation to obtain information relating to the interior of the workpiece (for example relating to material boundaries in the interior). Where mention is made in this description of a determination of coordinates of a workpiece, this also includes the determination of dimensions such as, for example, a width or a diameter of the workpiece.

Workpieces can be virtually completely measured with the aid of modern measurement methods. When use is made of coordinate measuring machines that can measure only surfaces of workpieces, this is also valid correspondingly for the workpiece surfaces. As a rule, the measurement results are displayed on a two-dimensional display medium such as paper, or on a computer screen. When an example of the workpiece (it being possible here for this to be the example measured with the aid of the coordinate measuring machine, or another example) is available to the viewer, it is of particular interest to assign the measurement results to the corresponding areas of the example. To this end, the viewer must adapt the alignment and position of the example relative to the viewer and/or the display of the measurement results to the alignment and position of the example relative to the viewer. As an example, given large deviations in the shape or dimensions between a desired state and actual state of the workpiece that occur in a specific area of the workpiece, the viewer would like to be able, as far as possible with one look, to identify which area of the workpiece is involved. In order, for example, to be able to view a surface area of the workpiece more accurately with the naked eye or with optical aids (for example magnifying glass or microscope), the area being an area configured in a way deviating sharply from desired stipulations, given a display of the measurement results on a computer screen the viewer has alternately to direct his look onto the computer screen and onto the example. In particular, when the defective area is very small the viewer is nevertheless unable to identify reliably which area of the actually existing example of the workpiece is involved.

Furthermore, when displaying and assigning measurement results there is the frequent problem of the availability of a multiplicity of information items that have been obtained from the measurement of the workpiece. Some measuring protocols have several hundred pages of paper or corresponding pages of an electronic document, and contain, for example, thousands of individual test features and evaluations. It is particularly difficult in the case of a multiplicity of measurement results to assign the measurement result to the associated area of the workpiece.

US 2003/0125901 A1 discloses a method and a system for testing a target object for correspondence to existing geometric dimensions and tolerance requirements. A selected feature of the target is measured, and the existing geometric dimensions and tolerance requirements are input to a user interface. Inputting includes the selection of a symbol that is a graphic symbol which represents a geometric dimension and a tolerance characteristic. It is also described in the document that a user can determine whether a specific feature that is being tested has already been tested previously. The user can select the previously measured feature. There are two options for the selection of this feature. Firstly, the feature can be selected from a feature list that includes a label for each measured feature. In accordance with the second option, the user can select the measured feature from the screen, that is to say with the use of a CAD-like interface. The user can select the feature that is to be tested by pointing to a graphic representation of the feature. A CAD-like interface that shows a perspective view of the target is indicated by the selection of a knob. The user selects the feature to be measured on the target by using a pointing device such as a mouse or a touch-sensitive screen.

However, the perspective display of the target is not an image of an existing example of the workpiece. Consequently, assignment to such an actually existing example is difficult. Neither is US 2003/0125901 A1 any more help when a multiplicity of measurement results that are simultaneously displayed on a screen are already present. In order to select a specific measurement result, US 2003/0125901 A1 merely proposes making a selection from a list, or using a CAD-like representation of the workpiece for the selection. However, if, when the user is struck in the case of an actually existing example of the workpiece by an area that apparently does not correspond to the desired state, it can in some circumstances be difficult to assign the area to the CAD-like representation.

Safety regulations must be observed when a user is in the region of a measuring device. For example, it can be dangerous to touch the workpiece while the measuring device is being operated. Consequently, it is frequently necessary for no one to be in the vicinity of the workpiece before and during the measurement. The measurement results are to be capable of selection only subsequently, when the measurement is concluded. The user can then once again, in some circumstances, view the workpiece from close quarters.

BRIEF SUMMARY OF THE INVENTION

It is an object of the present invention to specify a method and an arrangement of the type mentioned at the beginning that help the user to assign measurement results from the measurement of coordinates of a workpiece to a corresponding, associated area of an existing example of the workpiece.

It is proposed that gestures that a user executes be detected and assigned to individual measurement results. When a gesture has automatically been identified, at least one assigned measurement result is selected, or it is decided that no assigned measurement result exists. If at least one measurement result has been selected, it is only this measurement result or these selected measurement results that can be displayed. Such a selective display of at least one measurement result is also understood to mean that an already existing display of the measurement result or the measurement results is modified in accordance with the selection. For example, only the selected measurement result can be displayed in a screen area in which an area of the workpiece that is assigned to the selected measurement result is displayed. Alternatively, the selected measurement result can be illustrated otherwise than as previously, but the measurement results not selected can be displayed nevertheless. In particular, that is why measurement results in other areas than that affected by the selection can be displayed without change, and/or hidden, for example. The display of a selected measurement result is also understood to mean that the information required for the display or changed display is generated for the display device. The display device need not necessarily itself be included in the inventive arrangement.

When a workpiece is mentioned in this description, this also includes the case of an arrangement of a plurality of individual parts.

The workpiece available for viewing need not necessarily be the example of the workpiece that has been measured. For example, it is also possible that what is involved is another example from the same or a comparable production, or an example that corresponds largely or exactly to the desired state (for example because it is a master part). This is advantageous, in particular, when a plurality of different examples of the workpiece are measured and the measurement results are to be evaluated by the viewer, as is the case for series production.

A gesture is understood, in particular, as a movement executed by the hand or both hands of the user. For example, the gesture can also be used to display a shape and/or position symbol (for example in accordance with the Standard ISO-1101, that is to say the term shape and/or position symbol is to be understood, in particular, in the sense of this standard, and it is possible as an option for the gestures to display in particular the symbols predefined in this standard) in space or on a surface (for example a screen surface). For example, with the aid of his extended index finger the user can execute a circular movement in space or on the surface. Consequently, a predetermined gesture of "circle" is executed that corresponds in the ISO-1101 to, for example, the shape symbol of "checking roundness tolerance". Other shape and/or position symbols that correspond, for example, to a conical frustum, a parallelogram (and therefore a plane), a semicircle, a cylinder, a straight line or other shapes, can likewise be mimicked by a gesture. As an alternative or in addition to the named possibilities (that is to say, in particular as an alternative or in addition to the abovenamed shape symbols), a gesture can define other symbols which relate the various shapes to one another and/or to types of evaluation, for example an obliquely running arrow, parallel obliquely running arrows that are connected by a straight line, two concentric circles, the arms of an acute angle or of a right angle, two parallel straight lines, two nonparallel straight lines that correspond to the outlines of a conical frustum, or a circle with crosshairs.

The symbols mimicked by the gestures therefore relate preferably not only to the shape (for example circle, cone, cylinder, profile, plane surface, etc.) or to an area of the workpiece, but relate alternatively or in addition to the type of evaluation (for example straightness, flatness, roundness, profile of a line, profile of a surface, perpendicularity, angularity, parallelism, symmetry, concentricity, etc.). For example, a tolerance between an ideally circular surface and a surface area of the workpiece is selected with the symbol of "concentricity tolerance" in accordance with ISO-1101, referred to a surface of the workpiece.

An appropriate multiplicity of gestures are preferably predefined. A possibly existing predefined gesture can be determined by an identification of the gesture, for example by an image detection and identification device or by a touch-sensitive screen, as a result of which the selection of at least one measurement result that corresponds to the gesture is initiated. It is preferred in this case that the measurement result relates coordinates of measurement points to desired values and/or desired states of the workpiece.

In accordance with a further idea of the present invention, the selection of the at least one measurement result is not undertaken exclusively as a function of the gesture, but furthermore as a function of the location and/or the alignment of the gesture. The location and/or the alignment of the gesture are preferably detected with reference to an actually existing example of the workpiece, and/or with reference to a graphic illustration of the actually existing example. For example, the user executes a predefined gesture in the immediate vicinity of the existing example, specifically preferably in the area of the example that is assigned to the measurement result to be selected. When the gesture is executed on a displayed image, the detection of the position and/or alignment of the gesture is preferably referred to the coordinate system of the image display device, for example to the two-dimensional surface of a touch-sensitive screen.

If, for example, there exist at least two similar measurement results that can, for example, be selected by the same symbol, but are assigned to different locations and/or areas of the workpiece (for example, roundness of two different bores), the detected position of the gesture is used to determine which measurement result the user has selected by his gesture.

The gesture can be executed with the aid of an object, for example a stylus or another elongated, rod-shaped object. In this case, the object can have means with which the user can output a signal to the gesture detection unit. For example, a stylus can be equipped with an actuator and a wireless transmitting device such that upon actuation of the actuator a signal is output by the stylus (or another object) to the gesture detection device. With the aid of such a signal, the user can define that the currently adopted position and/or alignment of his hand or of the object are/is important for the gesture.

However, the gesture detection device is preferably configured such that it identifies gestures executed by one or more hands, there being no need for further objects in order to execute the gesture. This does not preclude the hand from bearing an object such as, for example, a ring on the finger. This object is, however, not required to execute the gesture and not important.

When the gesture is executed on the existing example of the workpiece, the user can touch, or not touch, the example when executing the gesture. In both cases, the gesture can, nevertheless, be assigned to a specific area of the example. Particularly when the gesture is executed on the existing example, but also when the gesture is executed on a screen, at least one camera can be present which records images continuously or repeatedly and thereby detects the gesture. It is also possible that only one image is detected per gesture. In this case, the gestures are defined such that they enable selection of at least one measurement result without movement of the hand. For example, the user can respectively use the index finger of the right hand and the left hand to point to a point on the surface of the example or of the image of the example, the result being that these two surface points are determined. By way of example, it is possible to assign thereto the evaluation of the distance between two points that respectively correspond to the point selected by the index finger, or lie nearest thereto. The points that are at all available for selection can be special points such as, for example, points at corners of the workpiece. Such a restriction on the points available for a selection facilitates the selection of points that are important for meaningful measurement results. For example, when selecting a point on the surface of the workpiece, or else in other cases, it is possible when selecting the measurement result to test, as a function of the type of gesture identified, to which points or areas of the surface of the workpiece an evaluation corresponding to the gesture, and thus a corresponding measurement result are assigned. It can then be decided automatically that the measurement result has been selected that is assigned to the location which lies nearest to the location selected by the user. However, it is also possible in cases of doubt to require from the user a confirmation in the form of a further gesture and/or in another form. For example, a plurality of possible measurement results produced by the gesture can be automatically preselected. These preselected measurement results can be displayed on the screen, and the user can make a further selection in a predefined way (for example, by operating a keyboard, computer mouse and/or by a further gesture), that is to say can eliminate at least one of the preselected measurement results. The remaining measurement result(s) can then be displayed.

It is fundamental for this description that the selection of one by means of a gesture can also lead to elimination. The display, following therefrom, of the selected of the result can thus consist in this measurement result no longer being displayed.

Apart from the gestures that signify a selection of at least one measurement result, a further process can also be initiated by at least one further gesture, for example that the measurement result selected as a consequence of the first gesture is displayed, rejected, deleted, printed out, stored, and/or passed on to another device.

The invention relates, in particular, to the display of measurement results of workpieces that are manufactured in series production. For example, individual examples, or all manufactured ones, can be measured by a coordinate measuring machine or an arrangement of coordinate measuring machines in the course of series production. The measurement results obtained therefrom can then, for example, be selected at another point in the manufacturing plant that is passed by the manufactured examples by gestures of a user. For example, there is available at this point in the manufacturing plant a screen or an image or beam projection system with the aid of which screen or system the selected measurement result(s) is/are displayed directly on the example or in the immediate vicinity of the example. It is a particular advantage in series production to be able to select specific measurement results from a multiplicity of measurement results without any aid in order to be able to intervene as early as possible in the manufacturing process when faults occur during manufacture.

The following is proposed, in particular: a method for the display of results of a measurement of a workpiece, in which
   a1) a predefined gesture of a user that the user executes on an existing example of the workpiece is detected and identified, or
   a2) a predefined gesture of a user that the user executes on an image of an existing example of the workpiece is detected and identified,
   b) at least one position at which the gesture is executed being detected during the detection of the gesture, and
   c) a measurement result being selected as a function of the identified gesture and the detected position of the gesture, and displayed.

Furthermore, an arrangement is proposed for the display of results of the measurement of a workpiece, the arrangement having the following:
   i. an interface for receiving the results of the measurement, and/or a memory for storing the results of the measurement,
   ii. a gesture detection device for detecting a predefined gesture of a user that the user executes on an existing example of the workpiece, or for detecting a predefined gesture of a user that the user executes on an image of an existing example of the workpiece, detects,
   iii. a position detection device for the detection of a position at which the gesture is executed,
   iv. an identification device for the identification of the gesture as a predefined gesture, and
   v. a selection device for the selection of a measurement result of the determination of coordinates of the workpiece as a function of the detected position and the identified gesture.

An image display device on which the selected measurement result is displayed can, furthermore, belong to the arrangement.

Apart from the detection of the position, the detection of the alignment of the gesture and taking the alignment into account for the selection of the measurement result are also advantageous in many cases. For example, a different measurement result can be selected during execution of a circular movement as a function of whether the circle lies in a horizontal plane, a vertical plane or in another plane. Consequently, an alignment detection device can be provided as an alternative, or in addition to a position detection device for detecting the position of the gesture. In this case, these two detection devices can also be the same detection device. For example, where at least one camera is used for a detection, the evaluation of the images taken by the camera can yield both the position and the alignment of the gesture.

Particularly when the alignment of the gesture is also important for the selection of the measurement result, it is preferred to make use of a plurality of cameras for the detection of the gesture as well as its position and/or alignment, said cameras being directed at various viewing angles onto the area in which the gesture can be executed.

The assignment between a measurement result and a gesture can, for example, be learned by teaching in a training process of the detection device which gesture is assigned to which measurement result or which type of measurement results. To this end, the user executes the gesture once or several times, for example, and assigns the gesture to the desired measurement result. In this process, the gesture is preferably not assigned to a concrete measurement result obtained by measurement of a specific example, but to a type of measurement result, for example the determination of the diameter of a sphere.

The measurement results available for the selection can be measurement results of any desired type. Consequently, the type of the display of the at least one selected measurement result can also differ. For example, particularly defective surface areas can be marked with the aid of symbols, flags and/or bars that are selected to be larger or smaller as a function of the degree of a desired value/actual value deviation. Numerical data and/or inscriptions can also be used for the display of the measurement results. In particular, all types of evaluations that are included in the Standard ISO 1101 (or in comparable standards) can occur in connection with the invention. The evaluations can lead to corresponding measurement results from which at least one measurement result is selected in accordance with the gestures executed by the user.

A frequently occurring type of evaluation is the evaluation of a contour, for example roundness, flatness or linearity. The contour profile can be represented with exaggerated height for the purpose of a better display of the selected result.

For example, the measurement results can also be displayed with the aid of various colors and/or gray levels on a screen or display, the individual colors and/or gray levels respectively corresponding to a category of measurement results. For example, surface areas of the workpiece that deviate more strongly from a desired state of the workpiece are displayed in another color than surface areas that do not deviate from the desired state, or do so only slightly. A color can be assigned to each degree of the deviation. The deviation can, for example, be a deviation of the position of a surface point relative to a reference point, and/or a deviation of the profile (for example waviness or roughness) of the surface. The display of measurement results with the aid of colors and/or gray levels is denoted in the literature as false color display.

By way of example, the selected measurement result can preferably be displayed in the correct position with reference to an image of the actually existing example, or in the correct position with reference to the example of the workpiece lying in the field of view of the viewer (that is to say of the user, for example). Display in the correct position is understood to mean that the information is displayed at locations of an image display device where the viewer also respectively sees the location of the example that corresponds to the measured coordinates. For example, in the case of a false color display a surface area of the actually existing example of the workpiece is colored with the respective color. In this case, apart from the color, the real surface of the actually existing example can preferably also be identified by the viewer.

In accordance with the abovedescribed proposal, coordinates of the example of the workpiece, that is to say of an actual state, are measured. Information assigned to the coordinates and relating to the actual state can be generated therefrom. This can merely be a specific display of the coordinates, for example a specific data format. However, it is preferred that an evaluation already be performed with reference to the desired state upon the generation of the information assigned to the coordinates. For example, for one or more measured coordinate data sets of surface points of the workpiece it is possible to calculate how far the surface point is removed from the desired state with reference to a reference point of the workpiece or of a coordinate system of the workpiece or with reference to a reference object (such as, for example, another surface of the workpiece). For example, it can be found that a surface point lies at a specific distance and in a specific direction away from the position of a corresponding point in accordance with the desired state of the workpiece. The distance and optionally also the direction can, for example, be displayed by a false color display (see above). Other possibilities for the description of measurement results from coordinate measurements of the workpieces than the distance are familiar to the person skilled in the art and can likewise be applied. In general, variations in shape, dimension and/or position, for example, can be determined as measurement results and optionally also be displayed in the correct position after the selection by a gesture of the user.

The selection of the measurement result by means of the gesture, together with the optional display, in the correct position, of the information relating to the actual state with reference to the example of the workpiece, which corresponds to the actual state or a desired state (for example a CAD model) substantially assists the viewer in assigning the information to the real, actually existing example and its areas (in particular its surface areas). This facilitates, for example, the identification of causes of a faulty manufacture of an example of the workpiece.

The real example of the workpiece can actually lie in the field of view of the viewer during the execution of the gesture. However, it is also possible for the workpiece to lie next to the field of view of the viewer, for example, and for an image for the selection of the at least one of the result to be generated by an image generation device, which image is displayed on a screen. When the example lies in the field of view, it can lie behind the display device and either be covered thereby, or can be viewed through the display device. In each case, the existence of the example enables the viewer also to view the workpiece independently of the image display device. For example, the viewer can take a small example of the workpiece into his hand and view it more accurately with the aid of a magnifying glass. In the case of larger workpieces, the viewer can, for example, walk around the example or approach the example more closely.

By way of example, the two configurations described below are particularly advantageous:

In the first configuration, the actually existing example can be arranged behind the image display device when seen from the viewing position (that is to say behind the screen, in particular), and the viewer can see the example through the image display device (in particular the screen). Appropriate semitransparent screens that can be used for this purpose are known per se.

In the other configuration, the image display device is not semitransparent, and an image of the actually existing workpiece is displayed on a screen. This embodiment has the advantage that both the display of the example and the display of the measurement results can be varied, for example with reference to brightness, contrast and/or color intensity of the display, or in another way, such that, for example, the surface of the actually present example can be more effectively visible, or the information relating to the actual state can be more clearly identified. In the case of the configuration with the semitransparent screen, by contrast, the intensity of the light passing through the screen, which emanates from the surface of the actually existing example, is bounded above. The semitransparent screen reflects and absorbs a portion of this light.

Particularly in the case of the configuration with the non-semitransparent screen, consideration for the present invention is also given to portable computers, such as so-called handheld computers (for example cell phones with a large display and corresponding computational capability, such as are currently commercially available), organizers, PDAs (personal digital assistants) and Tablet PCs, but also notebook computers (for example with foldable flat screens having screen diagonals typically greater than 8 inches). The screens or displays of these computers can be used as an image display device. With modern cell phones or handheld computers, there are very often camera objectives arranged on the side opposite the screen, and these can be used to generate an image of the actually existing workpiece example. With notebook computers, it is possible, for example, for the example to be arranged on the rear of the foldable screen part of the computer and, in addition, to fit on this part a camera that takes the image of the workpiece.

It is preferred for a position and alignment of the existing example of the workpiece to be detected automatically and, furthermore, for the measurement result(s) optionally to be displayed in the correct position as a function of the selection of at least one measurement result. Alternatively or in addition, a movement of the example during the display of the selected measurement results is tracked on the image display device and the display of the measurement result is continuously adapted in accordance with the tracking of the movement such that the information is permanently displayed in the correct position. Since the result of the tracking of the movement of the example is firstly processed using data technology, in order to enable the information to be displayed in the correct position, the display in the correct position can be performed with a short time delay, however, with powerful microprocessors this short time delay is scarcely perceptible to the viewer.

So-called tracking systems can be used both to detect the position and alignment of the workpiece example, and to track the movement. All known principles of tracking can be used in this case. For example, the tracking system can be a system that is based on the magnetic principle. To this end, at least one generally very small coil, which has a current flowing through it, (or an arrangement having a plurality of coils) is tracked in an external magnetic field. The coil is mechanically connected to the example of the workpiece such that it is also possible to detect the position, alignment and movement of the example. Such tracking systems are manufactured, for example, by the Ascension Technology Corporation, Burlington, Vt. 05402, USA.

Alternatively or in addition, a position and/or viewing direction of the user can be automatically detected and be taken into account in the selection of the at least one measurement result of the determination of coordinates. Moreover, the measurement result can optionally be displayed in the correct position on an image display device as a function of a result of the detection of the position and/or viewing direction of the user. In turn, a tracking system can be used to determine the position and/or viewing direction. By way of example, the tracking sensor (for example the abovementioned coil or arrangement of a plurality of coils) is fitted on the viewer's head. Spectacles or a clip that can be suspended from the viewer's ear, for example, are suitable for the attachment.

In general, the invention can also be implemented with data goggles as image display device. In this case, the tracking sensor is, as frequently is the case with augmented-reality devices, can be integrated in the data goggles or be connected to them mechanically. Another term used in the literature for data goggles is head mounted display. This expresses the fact that the device fitted on the viewer's head need not have the form of classic spectacles. Again, in this case the display must be nontransparent, that is to say semitransparent.

Exemplary embodiments of the present invention are now described with reference to the attached drawing. Of the individual figures in the drawing:

BRIEF DESCRIPTION OF THE SEVERAL VIEWS OF THE DRAWING

FIG. 2 shows a screen display of a workpiece having two surface areas that deviate to a different degree from a desired state, and having a further measurement result, FIG. 3 shows an alternative to the arrangement in accordance with FIG. 1, a view of an example of a workpiece being detected by a camera, FIG. 7 shows a display on a screen which represents a measurement result of a determination of a contour profile, the contour profile being represented with exaggerated height.

DESCRIPTION OF THE INVENTION

Figure 1:
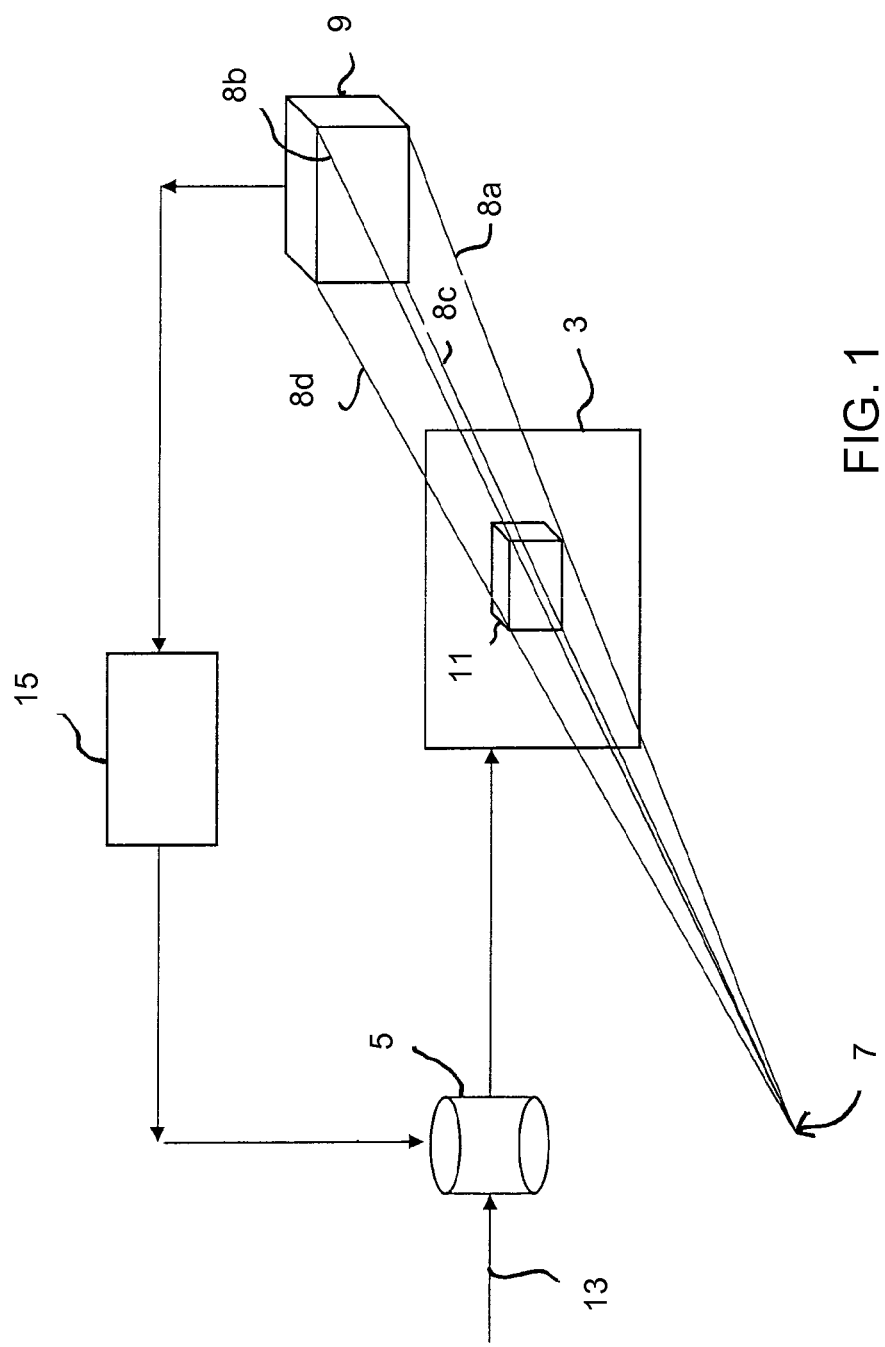
FIG. 1 is a schematic of an arrangement with an example of a workpiece that can be viewed through a semitransparent screen by a viewer.

FIG. 1 is a schematic of a semitransparent screen 3 on which, in a manner controlled by a data processing device 5, it is possible to display measurement results from the measurement of coordinates of a workpiece. The measurement results can, for example, be displayed in a false color display and/or as dimensions, as shown in FIG. 2. This will be examined more closely below.

From a viewing position 7, a viewer (not illustrated in FIG. 1) sees an example 9 of the workpiece through the semitransparent screen 3. In the plane of the screen 3, the example 9 appears with a size that is illustrated in FIG. 1 by the cuboid 11. Four lines 8a-8d make clear that the object 11 apparently lying in the image plane of the screen 3 is merely an image of the actually existing example 9.

In an alternative configuration of the arrangement, the object 11 can be an image object generated by the image display device by driving the screen 3 appropriately. In this case, a camera which images the example 9 is arranged on the rear of the screen 3, for example.

However, in the case of the arrangement illustrated in FIG. 1 it is only the measurement results that are displayed on the screen 3 by the controller 5 of the screen 3, but not the workpiece. After the selection of at least one measurement result by a gesture of the viewer or another user, the display of the at least one measurement result is displayed in the correct position, that is to say at locations on the image display device where the viewer sees a specific area of an example 9, the associated measurement information, which is assigned to the area of the object, is also displayed. "Assigned" is to be understood in the sense that this area of the example or of another example of the workpiece has been measured and information relating to the actual state obtained by the measurement has been obtained therefrom. In general, to this end coordinates of this area of the workpiece are measured, and the information relating to the actual state, that is to say the measurement results, of the area are obtained therefrom. Optionally, measurement results can also be displayed in the correct position even before the selection. However, what is involved in this case is frequently too many measurement results, and so the user is unable to assign specific measurement results that are currently the object of his interest to the example of the workpiece and/or specific areas of the workpiece, or can do so only with restrictions.

The measurement results are fed to the data processing device 5, which also has the controller of the screen 3, via the interface indicated by an arrow on the left in FIG. 1. This can take place while the measurement results are being displayed on the screen 3. In many cases, however, it seems to be advantageous to undertake the measurement of the workpiece in advance, since coordinate measurements take some time. The workpiece need not be the same example that is present and can be viewed directly or indirectly by the user.

Also illustrated in FIG. 1 is a tracking system 15 (illustrated schematically by a rectangle in the upper part of the figure) which continuously detects the position and alignment of the example 9. This detection is indicated by the arrows shown in the upper right-hand part of the figure. In particular, it is also possible for the same tracking system to detect both the position and alignment of the example 9, and the gestures of the user. Such a configuration will further be described with reference to FIG. 4. Such tracking systems preferably use at least one camera to detect images of the example, and the gestures.

In accordance with the position and alignment of the example, the tracking system 15 generates signals that are fed to the data processing 5. This is illustrated by two arrows in the left-hand upper part of the figure. The data processing 5 generate therefrom the information that is required to display the measurement results in the correct position on the screen 3.

In particular, the coordinate system to which the tracking system refers in the determination of the position and alignment of the example 9, and the coordinate system of the image content for the display on the screen 3 are registered before or at the beginning of the display, that is to say the coordinate systems are brought into relation to one another such that it is possible to display the measurement results in the correct position. The registration can be performed interactively, for example, in that the data processing device 5 displays image content at selected positions on the screen 3 (for example an arrow), and the user scans corresponding points of the surface of the example 9, which are to be assigned, with the aid of a special signal transmitter whose position can be detected by the tracking system 15, and outputs a signal to the tracking system 15 or the data processing device 5. It is possible in this way for the tracking system 15 or the data processing system 5 to learn that the position currently being indicated on the screen 3 lies at a specific location on the surface of the example 9. A complete, interactive registration can be carried out if this procedure is carried out for at least three locations on the surface of the example 9.

However, it is also possible to perform the position and alignment of the example 9 by, for example, an automatic acquisition of images of the example 9 and an automatic evaluation of these images. By way of example, in this case characteristic locations of the surface are identified from the images and assigned to the current positions of the real example 9 with the aid of a computer model of the workpiece (which can also represent the desired state).

There is no need for initial registration to be carried out in the case of such a method. Rather, it is possible in this way for the correct position and alignment of the example 9 to be determined continuously. However, the initial registration is preferred, since the tracking of the movement of the example 9 and the associated change in the position and alignment of the location of the example 9 can be detected with less outlay on computation and thus more quickly. In particular, this tracking of the movement can be carried out automatically by the tracking system. However, it is also possible for the tracking system to be integrated into the data processing device 5.

FIG. 2 shows, particularly for the case of FIG. 1 but also for other cases, a schematic of a first area 21 and a second area 23 in an illustration in the correct position on the surface of the workpiece to be viewed. The workpiece is illustrated, again schematically, in FIG. 2 by a cuboid, the latter being an image actively displayed on the screen by the image display device, and/or an image that appears to lie in the image plane of the screen 3, because the viewer can see the object directly through the screen 3. Moreover, a double arrow in FIG. 2 indicates that a dimension of the cuboid 11 is being illustrated on the screen 3, specifically the distance between the upper and the lower approximately horizontally extending surfaces of the cuboid 11. By way of example, the distance can be a local distance on the left-hand edge of the cuboid 11, or the average spacing of the two said surfaces.

Although an image plane is addressed here, the invention is not restricted to planar image display devices with a single image plane. Rather, the image display device can also be a device for display of three-dimensional images, for example with the aid of stereoscopic methods. It is also to be borne in mind in the case of a semitransparent screen that a viewer with two eyes views the actually existing example 9 in the case of FIG. 1 from two observing positions, since the two eyes of the viewer are spaced apart from one another and are therefore positioned at two different locations. This is preferably taken into account for the display in the correct position. Particularly in the case of a stereoscopic display, there is a possibility to undertake for each eye a display of the information related to the actual state of the workpiece that is specifically tuned to the eye. This also includes the case when a separate screen or separate region of a screen (such as, for example, semitransparent data goggles) is used for each eye.

The areas 21, 23 on the surface of the workpiece that are illustrated in FIG. 2 are hatched in a different way in the illustration of FIG. 2. In practice, instead of the hatching it is possible, for example, to display each area in a different color, or in different gray levels. Each of the areas 21, 23 indicate a degree, assigned to the color or gray level (here the hatching), of positional deviations of the surface of the workpiece. Deviations are to be understood here to mean that the measured actual state deviates from the desired state. For example, the surface area that corresponds to the area 21 deviates by 0.1 to 0.2 μm of the desired position, and the surface area that is marked by the area 23 deviates by 0.2 to 0.3 μm from the desired position.

Moreover, as already mentioned, a dimension of the workpiece is displayed on the screen 3. The display in accordance with FIG. 2 is merely a simplified example. In practice, a multiplicity of measurement results from the coordinate measurement of a workpiece are present as a rule and lead to a cluttered screen display in the absence of selection of individual measurement results. Otherwise than as shown in FIG. 2, it is also possible to use numerals and letters, as well as other symbols, in the display of the measurement results. For example, the measured value, for example "23.753 mm", can additionally also be displayed on the screen for the dimension illustrated in FIG. 2.

Another type of a measurement result is illustrated in FIG. 7. The contour of a surface 73 of a measurement object 71 is displayed with exaggerated height on the screen 3. Consequently, the contour profile of the surface 73a, displayed on the screen 3, of the height-exaggerated display 72 varies more sharply and thus in a more clearly identifiable fashion than does the contour profile of the surface 73 of the measurement object 71.

The alternative, illustrated in FIG. 3, of an arrangement for the display of measurement results shows example 9 of the workpiece on the left in the figure. It is detected by a camera 31, and the camera outputs corresponding image data to the data processing device 35, which corresponds to the data processing device 5 in accordance with FIG. 1.

The data processing device 35 drives the screen 33 so as both to display the image of the example 9 taken by the camera 31, and display the measurement results of the workpiece preferably in the correct position. The display can look as shown in FIG. 2, for example.

A coordinate measuring machine is not shown in much detail in FIGS. 1 to 4. For example, with reference to the arrangement in FIG. 1 the coordinate measuring machine could be drawn in on the left of the figure such that the arrow with the interface 13 leads from the coordinate measuring machine to the data processing device 5.

Figure 4:
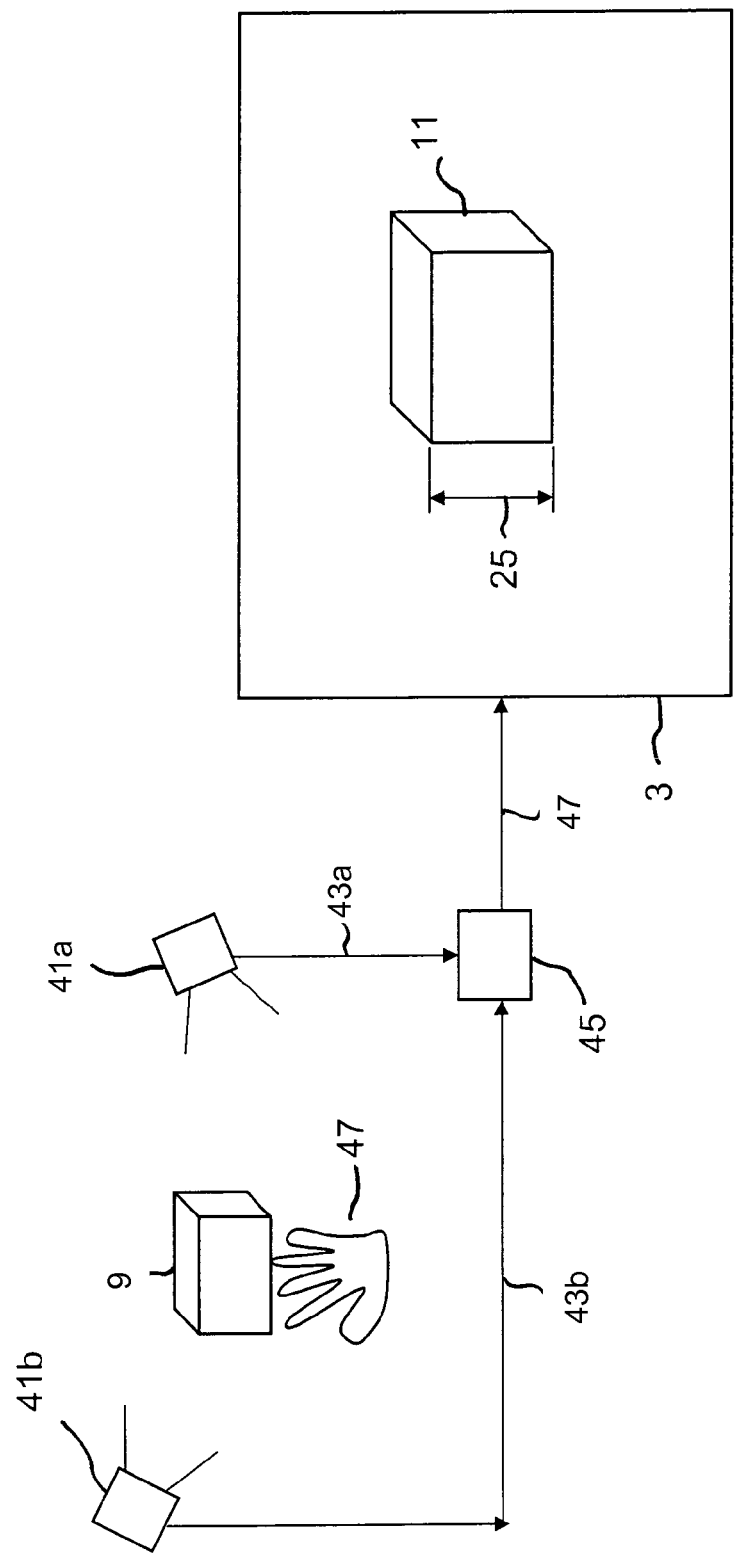
FIG. 4 is a schematic of a hand of a user in the vicinity of an example of the workpiece, the gesture executed by the hand being detected by a plurality of cameras in order to select at least one measurement result corresponding to the gesture.

FIG. 4 shows a location at which an example 9 of a workpiece is situated. At the location, a user can execute gestures with his hand 47, the hand 47 being situated in this case in the immediate vicinity of the example 9, or even touching this. Immediate vicinity is understood, in particular, as a distance of at most 5 cm, preferably at most 2 cm. The undershooting of such a limiting value for the distance can mean for the gesture identification device (and this is valid not only for the embodiment described here) the information that a gesture is being executed. In this case, the gesture identification device interprets an action of the user as execution of a gesture only as long as the limiting value is undershot.

In the exemplary embodiment, the location is situated in the field of view of a plurality of cameras 41a, 41b. Otherwise as illustrated in FIG. 4, it is also possible to direct more than two cameras onto the location. The cameras 41 are connected via image signal lines 43 to an identification device 45 that is configured to use the received camera images to identify a gesture executed by the hand 47 as one of a plurality of predefined gestures.

The identification device 45 is also optionally a device that detects the position where the gesture is being executed. In particular, the position is a relative position in relation to the example of the workpiece. Consequently, the detection device can be configured to detect not the absolute positions of the workpiece (that is to say, positions in the laboratory system) and the hand 47, but directly the relative position (that is to say, the position in the coordinate system of the workpiece) of hand 47 and example 9.

Furthermore, the detection device can be configured to detect the alignment of the hand 47 during execution of the gesture. The alignment can be detected with reference to the location where the example 9 and the hand 47 are situated. However, in a way similar to the detection of position, the alignment is preferably detected in a fashion relative to the example 9.

It is likewise possible to integrate in the identification device 45 a selection device for the selection of a measurement result of the determination of coordinates of the workpiece as a function of the detected position and of the identified gesture. The identification device 45 is, for example, a computer that executes said functions of identification, detection and/or selection in a way controlled by a computer program.

FIG. 4 shows a control connection 47 from the device 45 to the screen 3, via which image signals are transmitted from the device 45 to the screen 3. In the case of a commercially available computer, the device 45 has, for example, a video card that, under the control of a central processor of the device 45, generates the images to be displayed on the screen 3 in the form of image signals, and outputs them.

Starting from the state of the screen 3 as shown in FIG. 2, in which a plurality of measurement results are displayed, by way of example the execution of a gesture by means of the hand 47 takes place at the location, illustrated in FIG. 4, in the vicinity of the example 9. For example, otherwise than illustrated in FIG. 4 the hand 47 uses only an outstretched finger, for example the index finger, to execute a linear movement of the finger tip of the outstretched finger along the corner edge of the example 9, which runs at front left from top to bottom. This gesture is detected by the cameras 41 (that is to say consecutive images are taken and transmitted to the device 45). The device 45 identifies the relative position of the finger tip of the outstretched finger with reference to the example 9, that is to say it detects that a line along which the finger tip moves in space runs parallel to said corner edge and in the immediate vicinity of said corner edge. The device 45 uses the linear movement of the finger tip to determine that a linear dimension of the workpiece has been selected as measurement result. The device 45 uses the immediate closeness of the line to said corner edge to determine that the dimension 25 illustrated in FIG. 2 has been selected. Consequently, only this dimension 25 is displayed on the screen 3, and the other measurement results are hidden. Alternatively, the selected measurement result is highlighted, for example displayed in a particular color, or measurement results are repeatedly revealed and hidden.

Figure 5:
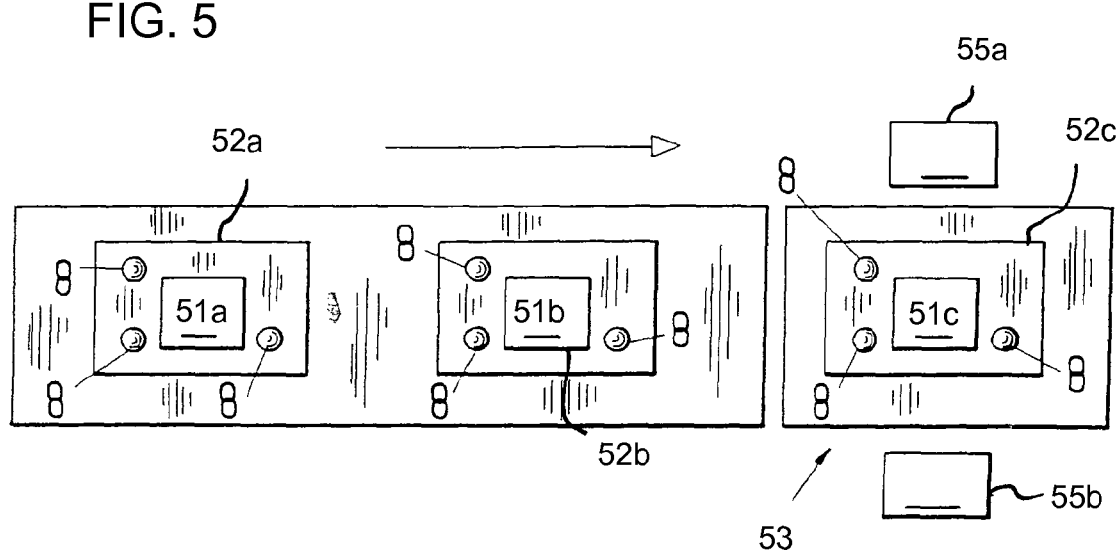
FIG. 5 is a schematic plan view from above of a part of a series production system, the system also having a measuring station for the measurement of coordinates of the manufactured examples and, alternatively or in addition to the measuring station there being present an evaluation station at which it is preferably possible to display measurement results of the measurement of an example of the workpiece on a screen, while the viewer of the screen also sees an example of the workpiece.

FIG. 5 shows a part of a manufacturing plant. As indicated by the arrow pointing to the right, the examples 51a, 51b, 51c that have been manufactured in the manufacturing process are transported from left to right. In the exemplary embodiment illustrated, they are in this case respectively situated on a transport means such as, for example, a pallet 52a, 52b, 52c. The pallets respectively have three markers 8, for example balls, whose position in relation to one another is known. A reference coordinate system thus exists.

Figure 6:
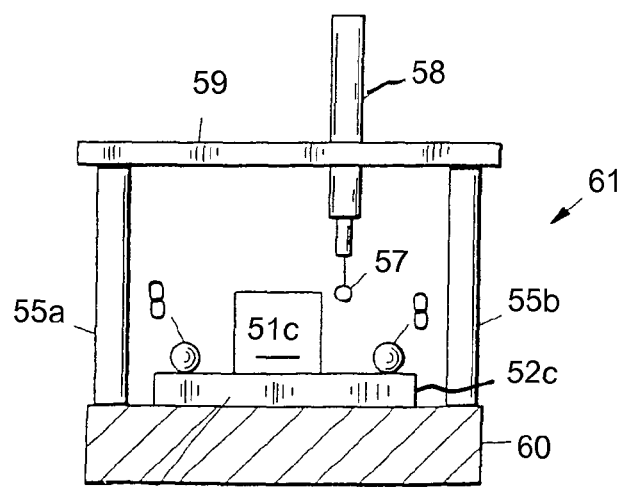
FIG. 6 shows the measuring station of the series production system illustrated in FIG. 5.

On the right in FIG. 5 is a measuring station 53 in which the example 51c arranged on the pallet 52c is measured. FIG. 6 shows the measuring station in a side view. In the exemplary embodiment, the measuring station is equipped with a coordinate measuring machine 61 in a portal design. The example 51c is arranged on the pallet 52c between two supports 55a, 55b of the portal. A quill 58 of the measuring machine 61 can move in a horizontal direction along a bridge 59 that connects the supports 55a, 55b. The bridge 59 can be moved relative to the supports 55 in a fashion perpendicular to the image plane of FIG. 6. Furthermore, the probe ball 57 arranged on the lower end of the quill 58 can be moved in the vertical direction for the mechanical scanning of the example 51c. Consequently, the surface of the example 51c can be scanned mechanically by the probe ball 57. The coordinates of the scanned surface points are determined therefrom in a way known per se.

Furthermore, the series production plant can have a measuring station (not illustrated in FIG. 5), for example a measuring station with the devices illustrated in FIG. 4 and described above.

FIG. 8 shows a plurality of symbols that are defined, for example, in ISO-1101 as shape and/or position symbols for the purpose of defining measurement results from the measurement of coordinates of workpieces. A user can therefore select the measurement result assigned to the symbol by executing a gesture that is identified as one of these symbols.

The individual symbols will now be described briefly below. However, reference is made to ISO-1101 for the details relating to the measurement results that are assigned to the respective symbol.

Figure 8A:
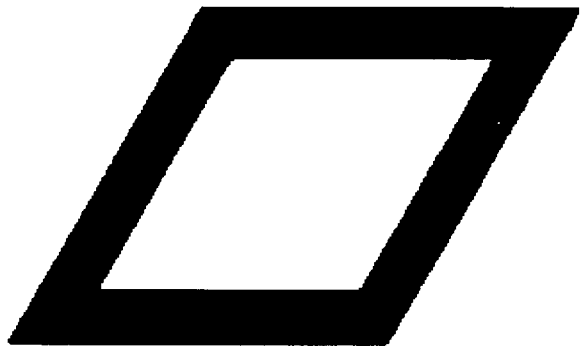
FIGS. 8a to 8o show a plurality of predefined shape and/or position symbols that can be displayed by a gesture.
Figure 8B:
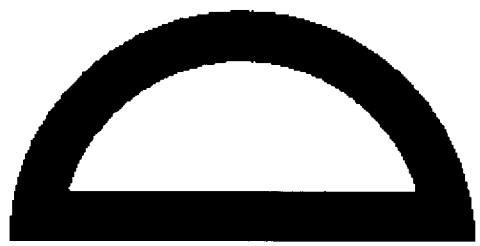
Figure 8C:
Figure 8D:
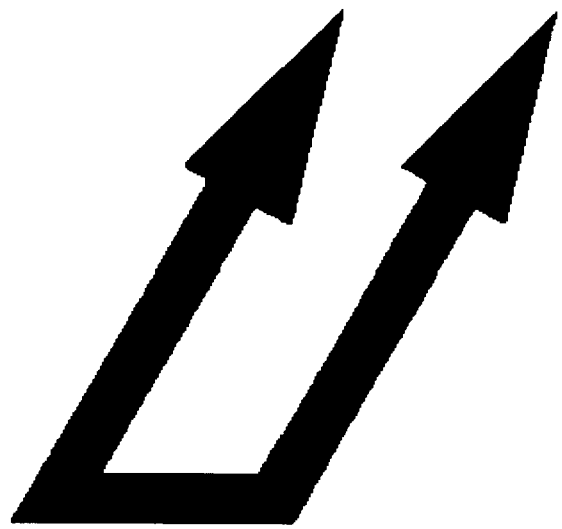

FIG. 8a shows a parallelogram. The flatness of a surface of the measured workpiece is assigned to this symbol. FIG. 8b shows a semicircle with a radius line, that is to say the outline of a half moon. The measurement result of "surface profile" is assigned thereto, that is to say a surface of the measured workpiece is compared with a desired geometry. FIG. 8c shows a straight, horizontally running line. The measurement result of "straightness", that is to say the deviation of a linear area or profile of the measured workpiece from a straight line is to be selected as measurement result. FIG. 8d shows two parallel arrows which run from top left to bottom right and whose lower ends are connected to a horizontal straight line segment. Depending on the relationship between workpiece and measurement, said line segment is assigned the measurement result of "total run-out tolerance" or "concentricity tolerance", that is to say a surface of the workpiece is assigned measurement results of a tolerance relating to a desired state or ideal state.

In the display of arrows as in the case of the symbol in FIG. 8d, the hand with which the gesture is executed can, for example, have a predefined finger position (for example index finger and middle finger are spread to form a V), while the hand executes a linear movement corresponding to the course of the arrow. This relates to the case where the gesture is executed in free space. However, it is possible to indicate in another way that the line which corresponds to the movement of the hand is an arrow. For example, as mentioned above, the hand can hold an object that has actuating means (for example a signal button for generating a signal). The gesture detection device can consequently be configured in such a way that it identifies the actuation of the actuating means and identifies independently thereof whether an arrow or a line is involved in the part of the gesture.

Figure 8E:
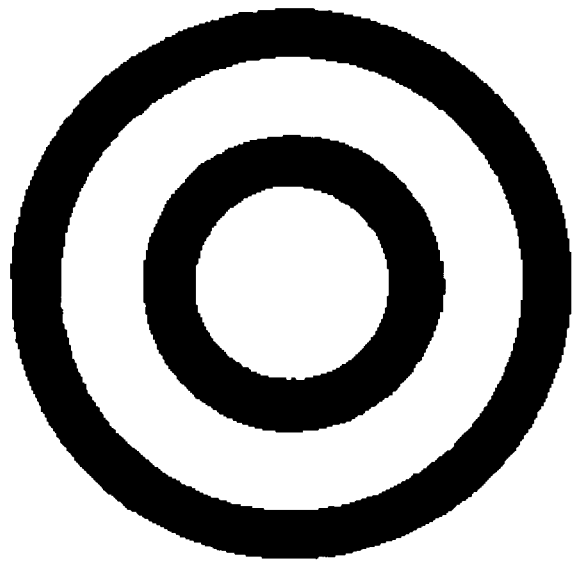
Figure 8F:
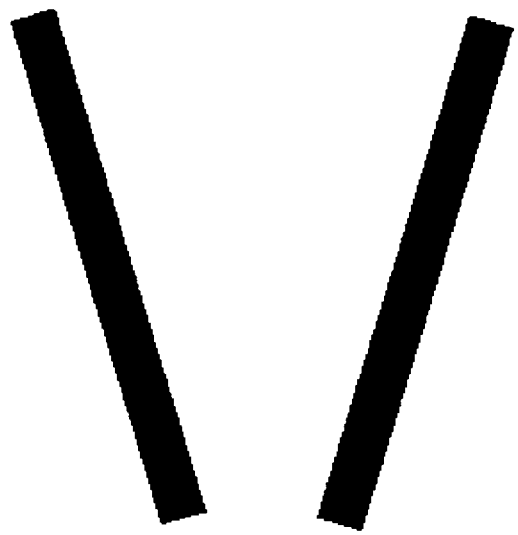

FIG. 8e shows two concentric circles. This symbol is associated with the measurement result "coaxiality tolerance" or "concentricity tolerance". Consequently, depending on context, the measurement result can denote whether coaxial or concentric elements are affected. FIG. 8f shows two lines of equal length that extend from top to bottom and enclose in so doing a tapering interspace. This symbol stands for the measurement result of "conicity". Consequently, measurement results are displayed that enable it to be identified to what extent the workpiece or an area of the workpiece deviates from a cylindrical shape or from a prescribed conical shape.

Figure 8G:
Figure 8H:
Figure 8I:
Figure 8J:
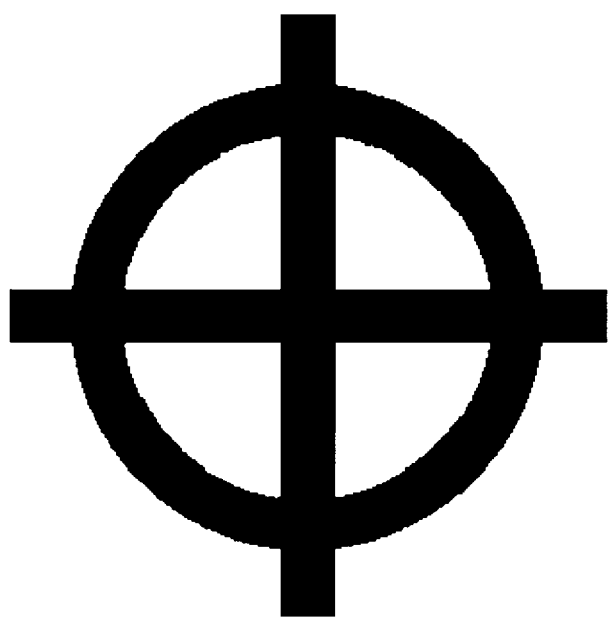
Figure 8K:
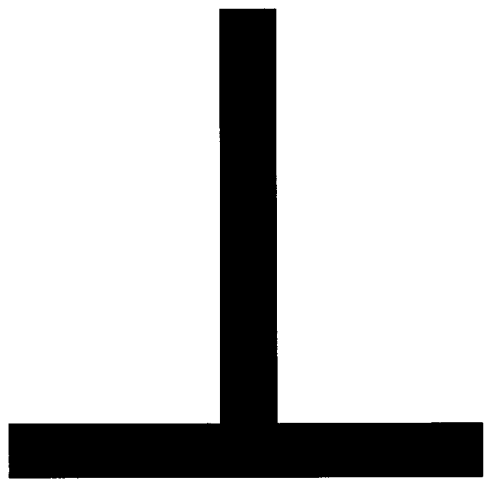
Figure 8L:
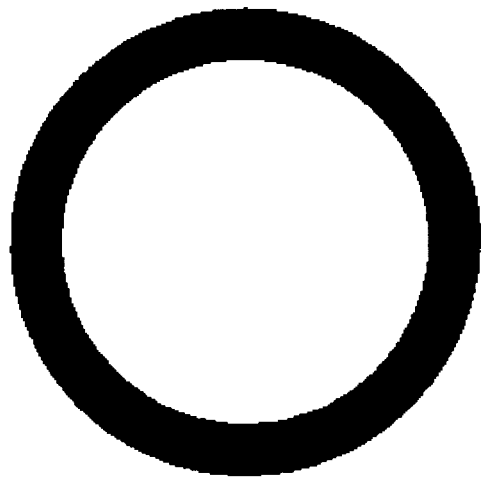
Figure 8M:
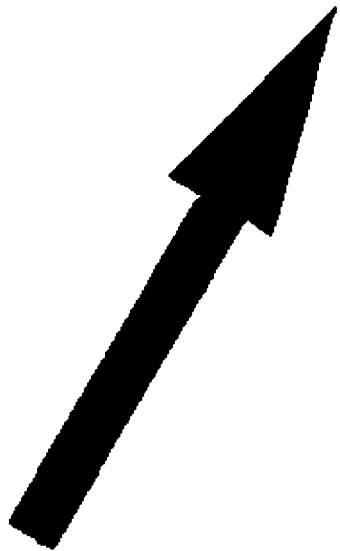
Figure 8N:
Figure 8O:

FIG. 8g shows a semicircle open at the bottom. The measurement result of "linear profile tolerance" is associated therewith. Deviations between a profile line of the workpiece and a desired line or ideal line that is prescribed are selected as measurement result. FIG. 8h shows two arms of an acute angle. The measurement result of "inclination" is assigned thereto. Alternatively or depending on the relationship between measurement and workpiece, the measurement result of "angle" can be assigned. The inclination is specified in the dimension of the length, the angle usually in degrees. FIG. 8i shows two parallel lines of equal length running from bottom left to top right. The measurement result of "parallelism" is assigned thereto, that is to say it is possible to select as measurement result the extent to which various linear or two-dimensional areas of the workpiece deviate from a parallel course. FIG. 8j shows a circle with crosshairs. The measurement result of "positional tolerance" is assigned thereto, that is to say the deviation of an assigned position of the workpiece from a desired or ideal position. FIG. 8k shows two arms of a right angle, that is to say a vertical arm extends perpendicularly upward in the middle of a horizontally running arm. The measurement result of "perpendicularity" is associated therewith, that is to say the deviation of linear or two-dimensional areas of the workpiece that run transverse to one another is specified. FIG. 8l shows a circle as symbol to which the measurement result of "roundness tolerance" is assigned, that is to say the deviation of an area of the workpiece from a circular shape. FIG. 8m shows a single arrow running from bottom left to top right. The measurement result of "concentricity tolerance" or "run-out tolerance" is linked thereto. By contrast to the symbol in accordance with FIG. 8d, the measurement result assigned to the symbol in accordance with FIG. 8m is referred to a line of the measured workpiece and not to an area. FIG. 8n shows three horizontally running lines which are positioned one above another, the middle line being somewhat longer than the upper and lower lines. This symbol stands for the measurement result of "symmetry". Consequently, it is possible to select measurement results that express whether areas of the workpiece deviate from an ideal symmetrical configuration and how. FIG. 8o shows two parallel lines of equal length running from bottom left to top right between which a circle is arranged that is touched in each case at opposite sides by the line in the manner of a tangent. The measurement result of "cylindricity" is associated therewith, that is to say it is possible to select as measurement result the extent to which an area of the measured workpiece deviates from a cylindrical shape.

The invention claimed is:

1. A method for displaying results of a measurement of a workpiece, which comprises the steps of:
    performing one of:
        detecting a gesture of a user being a movement executed by a hand or by both hands of the user on an existing example of the workpiece with a gesture detection device; or
        detecting a gesture of the user being a movement executed by the hand or by both of the hands of the user on an image of the existing example of the workpiece with the gesture detection device;
    automatically identifying a detected gesture as a predefined gesture that represents a symbol with a computing device;
    automatically selecting a measurement result of a measurement of the workpiece being assigned to the gesture in dependence on an identified gesture; and
    displaying the measurement result.

2. The method according to claim 1, wherein the symbol is at least one of a shape symbol or a position symbol that defines which type of evaluation of measured coordinates of the workpiece or of an area of the workpiece is to be provided as the measurement result, and in which the gesture is identified as the symbol.

3. The method according to claim 1, wherein in the detection of the gesture, at least one position at which the gesture is executed is detected, and the measurement result of the measurement of the workpiece is selected in dependence on the identified gesture and a detected position of the gesture, and displayed.

4. The method according to claim 3, wherein the step of detecting the gesture of the user being the movement executed by the hand or by both hands of the user on the existing example of the workpiece, further comprises:
    automatically detecting a position and an alignment of the existing example of the workpiece; and
    selecting the measurement result in dependence on a result of a detection of the position and the alignment of the existing example and in dependence on the detected position of the gesture.

5. The method according to claim 1, which further comprises:
    detecting an alignment of the gesture; and
    selecting the measurement result in dependence on the alignment of the gesture.

6. The method according to claim 1, which further comprises disposing the existing example of the workpiece behind an image display device when seen from a viewing position of the user, and in which the user executes the gesture on the image display device.

7. The method according to claim 6, which further comprises viewing the existing example of the workpiece from a viewing position through the image display device configured as a semitransparent display device.

8. The method according to claim 1, which further comprises generating an image of the existing example of the workpiece via an image generation device and displaying the image on a screen, and in which the user executes the gesture on the screen.

9. The method according to claim 1, which further comprises automatically detecting at least one of a position direction or a viewing direction of the user, and in which the position direction detected or the viewing direction detected is taken into account in the selection of the measurement result.

10. The method according to claim 1, which further comprises displaying a selected measurement result in a correct position with reference to the image of the existing example, or in a correct position with reference to the existing example of the workpiece, which is disposed in a field of view of the user.

11. The method according to claim 10, which further comprises displaying the at least one measurement result at a location or locations of an image display device at which the user respectively also sees a location of the existing example that corresponds to measured coordinates from which the measurement result was determined.

12. A configuration for displaying results of a measurement of a workpiece, the configuration comprising:
   at least one of:
      an interface for receiving results;
      a memory for storing the results;
      a gesture detection device for detecting a gesture of a user being a movement executed by a hand or by both hands of the user on one of an existing example of the workpiece or an image of the existing example of the workpiece;
   an identification device for identifying the gesture as a predefined gesture that represents a symbol; and
   a selection device for selecting a measurement result in dependence on an identified gesture.

13. The configuration according to claim 12, wherein said symbol is least one of a shape symbol and a position symbol that defines which type of evaluation of measured coordinates of the workpiece or of an area of the workpiece is to be provided as the measurement result, and said identification device is configured to identify the gesture as the symbol.

14. The configuration according to claim 12, further comprising a position detection device for detecting a position at which the gesture is executed.

15. The configuration according to claim 12, further comprising a determination device for determining a position and alignment of the existing example of the workpiece and which automatically determines the position and alignment of the existing example in a case of an execution of the gesture on the existing example of the workpiece, and said selection device is configured to select the measurement result in dependence on a result of determination of the position and alignment of the existing example and in dependence on a detected position of the gesture.

16. The configuration according to claim 12, further comprising an alignment detection device for detecting an alignment of the gesture, and said selection device is configured also to select the measurement result in dependence on a detected alignment of the gesture.

17. The configuration according to claim 12, further comprising an image display device, the existing example of the workpiece is disposed behind said image display device when seen from a viewing position of the user, and in which the user executes the gesture on said image display device.

18. The configuration according to claim 17, wherein the existing example of the workpiece can be viewed from the viewing position through said image display device configured as a semitransparent screen.

19. The configuration according to claim 12, further comprising an image generation device for generating an image of the existing example of the workpiece and for displaying the image on a screen.

20. The configuration according to claim 12, further comprising a detection device for detecting at least one of a position or a viewing direction of the user, and said selection device is configured to take account of at least one of the position or the viewing direction of the user during selection of the measurement result.

* * * * *